United States Patent
Won

(10) Patent No.: US 10,890,125 B2
(45) Date of Patent: Jan. 12, 2021

(54) METHOD FOR ALTERNATE CONTROL OF CVVD MALFUNCTION AND CVVD SYSTEM THEREOF

(71) Applicants: HYUNDAI MOTOR COMPANY, Seoul (KR); KIA MOTORS CORPORATION, Seoul (KR)

(72) Inventor: Min-Kyu Won, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/661,600

(22) Filed: Oct. 23, 2019

(65) Prior Publication Data
US 2020/0173380 A1 Jun. 4, 2020

(30) Foreign Application Priority Data
Dec. 4, 2018 (KR) ........................ 10-2018-0154406

(51) Int. Cl.
| | |
|---|---|
| F02D 41/00 | (2006.01) |
| F01L 1/047 | (2006.01) |
| F02D 41/22 | (2006.01) |
| F02D 13/02 | (2006.01) |
| F01L 13/00 | (2006.01) |

(52) U.S. Cl.
CPC .......... *F02D 41/0002* (2013.01); *F01L 1/047* (2013.01); *F01L 13/0015* (2013.01); *F02D 13/0207* (2013.01); *F02D 41/221* (2013.01); *F02D 41/222* (2013.01); *F01L 2013/0084* (2013.01); *F01L 2800/12* (2013.01); *F01L 2800/14* (2013.01); *F02D 2041/001* (2013.01); *F02D 2200/024* (2013.01); *F02D 2200/0402* (2013.01)

(58) Field of Classification Search
CPC .. F02D 41/0002; F02D 41/221; F02D 41/222; F02D 13/0207; F02D 2041/001; F02D 2041/227; F02D 2200/024; F02D 2200/0402; F01L 1/047; F01L 13/0015; F01L 2013/0084
See application file for complete search history.

(56) References Cited

U.S. PATENT DOCUMENTS

| | | | | |
|---|---|---|---|---|
| 2002/0066435 A1* | 6/2002 | Okamoto | ............ | F02D 13/0207 123/396 |
| 2005/0204805 A1* | 9/2005 | Wakahara | ........... | F02D 13/0207 73/114.72 |

(Continued)

FOREIGN PATENT DOCUMENTS

JP 2013-167223 A 8/2013

*Primary Examiner* — George C Jin
(74) *Attorney, Agent, or Firm* — Morgan, Lewis & Bockius LLP

(57) ABSTRACT

A method for an alternate control of a continuously variable valve duration (CVVD) malfunction may include a CVVD failsafe control to resolve a calculation error of a cylinder charge amount due to a hardware failure of a CVVD system with the cylinder charge amount determined by any one of flow rate alternate, flow rate deviation correction, and valve duration update if the hardware failure is recognized by a CVVD controller, and to apply the cylinder charge amount to secure an air amount for a combustion chamber.

20 Claims, 6 Drawing Sheets

(56) References Cited

U.S. PATENT DOCUMENTS

2007/0244625 A1* 10/2007 Hakariya ............ F02D 41/0002
  701/105
2014/0156170 A1* 6/2014 Eser .................... F02D 13/0226
  701/103

* cited by examiner

METHOD FOR ALTERNATE CONTROL OF CVVD MALFUNCTION AND CVVD SYSTEM THEREOF

CROSS-REFERENCE TO RELATED APPLICATION

The present application claims priority to Korean Patent Application No. 10-2018-0154406, filed on Dec. 4, 2018, the entire contents of which is incorporated herein for all purposes by this reference.

BACKGROUND OF THE INVENTION

Field of the Invention

The present invention relates present invention relates to CVVD system control, and particularly, to a continuous variable valve duration (CVVD) system adopting an alternate control of a CVVD malfunction capable of supplying an accurate amount of air to an engine even in a CVVD hardware failure situation.

Description of Related Art

In general, if a continuous variable valve duration (CVVD) system is applied as a variable valve mechanism, advantages of respective driving regions can be fully utilized through application of an optimum duration for each engine driving region using variation (i.e., duration adjustment from short to long) of a valve duration for controlling respective valve (e.g., intake valve) opening and closing time points, and tradeoff limits of the engine fuel economy and function can be profitably overcome.

Accordingly, it is necessary for the CVVD system to calculate an accurate valve position in which a calculation error for the air amount being introduced into a cylinder of the engine can be prevented from occurring, and technology to detect the valve position for detecting the valve position is required.

For this, as an example of the technology to detect the valve position, there is a hall sensing count scheme. The hall sensing count scheme counts values of a hall sensor applied to a brushless direct current (BLDC) three-phase type motor of an actuator, and analogizes a valve end position from a valve start position for a valve behavior through the sensing count.

Through this, the CVVD system can prevent a calculation error of the air amount which may cause hesitation, knocking, and start-off of the engine through the air amount operation using the valve start position rather than valve end recognition.

However, the hall sensing count type air amount operation applied to the CVVD system can be treated as valid information only on the assumption that a CVVD actuator mechanism device (i.e., actuator and mechanism part) to which a motor is applied is not damaged.

As an example, a disconnection of CAN communications or a loss of hall sensing information causes a valve to be unable to move due to difficulty of information exchange between the CVVD system and a controller, but the mechanism part of the CVVD system can move in a state where the actuator is stopped.

Since such movement of the mechanism part contrary to the stop of the actuator exerts an influence on the valve, the hall sensor value cannot secure an accurate valve position, and thus the controller may erroneously operate the position of the valve. As a result, the air amount calculation error may cause inconsistency of the amount of air required in the CVVD system, and thus the hesitation, knocking, and start-off of the engine may occur during the operation of the CVVD system.

Accordingly, in the hall sensing count type air amount operation, it is very important to generate strategies how to define the valve default position and how to calculate the amount of air when the CVVD actuator mechanism device fails, and through this, it is necessary to maintain the operation reliability of the CVVD system.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for an alternate control of a continuous variable valve duration (CVVD) malfunction and a CVVD system thereof, which can protect an engine in engine hesitation, knocking, and start-off situations caused by an erroneous operation of an air amount by determining the air amount even in a CVVD hardware failure situation and by heightening the determination accuracy of the air amount with respect to a valve default position through various air amount determination strategies, such as air amount alternate schemes, air amount deviation schemes, and air amount prediction schemes.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a method for an alternate control of a continuously variable valve duration (CVVD) malfunction includes a CVVD failsafe control to resolve a calculation error of a cylinder charge amount due to a hardware failure of a CVVD system with the cylinder charge amount determined by any one of flow rate alternate, flow rate deviation correction, and valve duration update if the hardware failure is recognized by a CVVD controller, and to apply the cylinder charge amount to secure an air amount for a combustion chamber.

As an exemplary embodiment of the present invention, the CVVD failsafe control is divided into an air amount alternate control applied to secure the air amount through determination of the cylinder charge amount by the flow rate alternate, an air amount deviation control applied to secure the air amount through determination of the cylinder charge amount by the flow rate deviation correction, and an air amount prediction control applied to secure the air amount through determination of the cylinder charge amount by the valve duration update.

As an exemplary embodiment of the present invention, the air amount alternate control includes a step of determining validity of a feedback sensor value through detection of a signal for a short/long duration position in the hardware failure; a calculation error alternate control step of determining the cylinder charge amount for resolving the calculation error of the cylinder charge amount if the feedback sensor value does not have the validity; an information application control step of determining the cylinder charge amount alternating the calculation error of the cylinder charge amount if the feedback sensor value has the validity; and a step of securing the air amount.

As an exemplary embodiment of the present invention, the calculation error alternate control includes the steps of turning off a CVVD power for the CVVD system; alternating the calculation of the cylinder charge amount by identifying the cylinder charge amount before determining the validity of the feedback sensor value; and changing the cylinder charge amount to a MAF sensor flow rate measurement value after identifying the cylinder charge amount.

As an exemplary embodiment of the present invention, the changing of the cylinder charge amount is performed with respect to the cylinder charge amount by a throttle model flow rate value or the cylinder charge amount by a pulsation non-correction value.

As an exemplary embodiment of the present invention, the air amount deviation control includes a step of determining validity of a feedback sensor value through detection of a signal for a short/long duration position in the hardware failure; a calculation error deviation control step of determining the cylinder charge amount for resolving the calculation error of the cylinder charge amount if the feedback sensor value does not have the validity; an information application control step of determining the cylinder charge amount alternating the calculation error of the cylinder charge amount if the feedback sensor value has the validity; and a step of securing the air amount.

As an exemplary embodiment of the present invention, the calculation error deviation control includes the steps of turning off a CVVD power for the CVVD system; determining the cylinder charge amount by determining a valve position using a valve duration just before the feedback sensor value does not have the validity; determining a deviation value through comparison of a MAF sensor flow rate with the cylinder charge amount calculation value, and determining a deviation of the cylinder charge amount through the deviation value; and performing deviation correction of the cylinder charge amount calculation.

As an exemplary embodiment of the present invention, deviation suitability is determined by applying a threshold value to the deviation value after determining the deviation value as a measurement value of the MAF sensor flow rate through subtraction of the cylinder charge amount calculation value therefrom. The deviation correction re-performs the cylinder charge amount calculation in consideration of the deviation value as a deviation correction factor or by mapping the deviation value to a map as a deviation correction factor.

As an exemplary embodiment of the present invention, the air amount prediction control includes a step of determining validity of a feedback sensor value through detection of a signal for a short/long duration position in the hardware failure; a calculation error update control step of determining the cylinder charge amount for resolving the calculation error of the cylinder charge amount if the feedback sensor value does not have the validity; an information application control step of determining the cylinder charge amount alternating the calculation error of the cylinder charge amount if the feedback sensor value has the validity; and a step of securing the air amount.

As an exemplary embodiment of the present invention, the calculation error update control includes the steps of turning off a CVVD power for the CVVD system; determining the cylinder charge amount by determining a valve position using a valve duration just before the feedback sensor value does not have the validity; predicting a valve closing time; updating the valve duration by applying the valve closing time prediction to the valve duration; and re-performing the cylinder charge amount determination by the valve position calculation using the valve duration update.

As an exemplary embodiment of the present invention, the valve closing time prediction is determined as a MAF flow rate or a throttle model flow rate.

As an exemplary embodiment of the present invention, the information application control includes determining a current valve position by a valve duration position in accordance with the feedback sensor value validity determination; and determining the cylinder charge amount for securing the air amount in the valve duration position.

In accordance with various exemplary embodiments of the present invention, a continuously variable valve duration (CVVD) system includes a CVVD controller configured to perform an air amount alternate control applied to secure an air amount for a combustion chamber through calculation of a cylinder charge amount by a flow rate alternate to resolve a calculation error of the cylinder charge amount due to a hardware failure, an air amount deviation control applied to secure the air amount for the combustion chamber through calculation of the cylinder charge amount by a flow rate deviation correction, and an air amount prediction control applied to secure the air amount for the combustion chamber through calculation of the cylinder charge amount by a valve duration update.

As an exemplary embodiment of the present invention, the CVVD controller is configured to recognize the air amount of an intake line by a mass air flow (MAF) air flow rate measurement value detected by a MAF sensor provided in the intake line for sending the air flow rate to the combustion chamber.

As an exemplary embodiment of the present invention, the CVVD controller is configured to output a control command to a CVVT system connected to a cam shaft to drive the CVVT system.

The CVVD control applied to the CVVD system according to an exemplary embodiment of the present invention satisfies the air amount required by the engine through the failsafe control and implements the following operations and effects.

First, it is possible to safely move a vehicle even in the CVVD hardware failure situation. Second, it is possible to provide big effects in safety for preventing a secondary accident in a component failure situation through the vehicle movement maintenance. Third, it is possible to save unnecessary towing fees through the vehicle movement maintenance and to minimize client's dissatisfaction. Fourth, it is possible to prevent the hesitation, knocking, and start-off of the engine since the air amount necessary for the engine is provided even if the operation of the CVVD system is stopped. Fifth, it is possible to expect additional cost saving in after-sales service cost through prevention of the engine damage due to the knocking.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
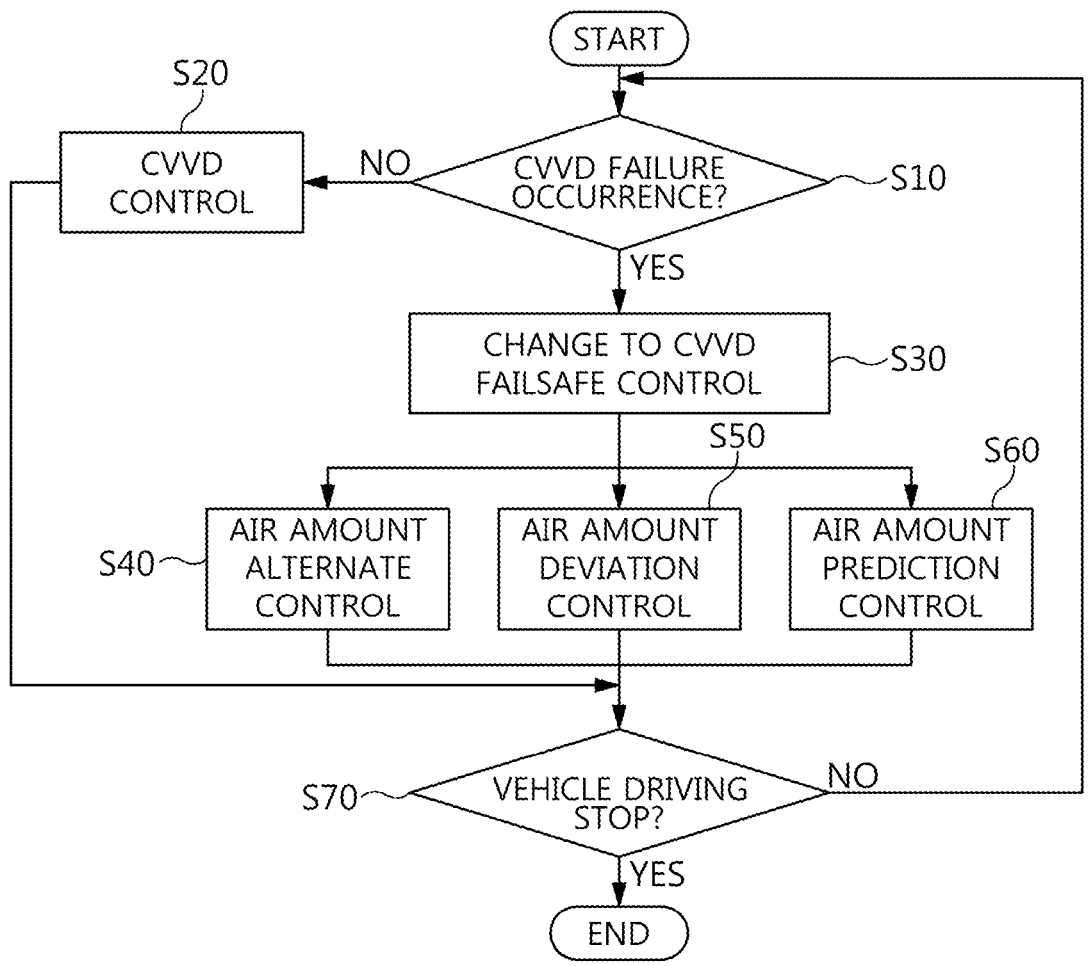
FIG. 1 is a flowchart illustrating a method for an alternate control of a CVVD malfunction according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the contrary, the present invention(s) is/are intended to cover not only the exemplary embodiments, but also various alternatives, modifications, equivalents and other embodiments, which may be included within the spirit and scope of the present invention as defined by the appended claims.

Hereinafter, an exemplary embodiment of the present invention will be described in detail with reference to the accompanying exemplary drawings. However, since such an exemplary embodiment is exemplary and can be implemented in various different types by those of ordinary skill in the art to which the present invention pertains, the present invention is not limited to the exemplary embodiment described hereinafter.

Referring to FIG. 1, a CVVD malfunction alternate control method switches to a CVVD failsafe control (S30) if a CVVD malfunction in which a CVVD control (S20) is unable to be performed occurs (S10). In the instant case, the CVVD failsafe control (S30) is divided into an air amount alternate control (S40), an air amount deviation control (S50), and an air amount prediction control (S60) to perform vehicle driving (S70).

As a result, the failsafe control method for the air amount satisfaction prevents an air amount operation error due to an inaccurate valve duration value through different schemes classified into the air amount alternate control (S40), the air amount deviation control (S50), and the air amount prediction control (S60), and thus not only engine hesitation and knocking which may occur due to an air amount error in a CVVD failure situation but also an engine start-off can be prevented to maintain driver's safe driving.

Accordingly, the vehicle enables the driver to maintain the driving without getting into danger of the secondary accident in safety during the CVVD failure, and the unnecessary towing charge and the after-sales service cost due to the knocking can be saved. Furthermore, the client's dissatisfaction can be minimized in client satisfaction to improve merchantability.

Figure 2:
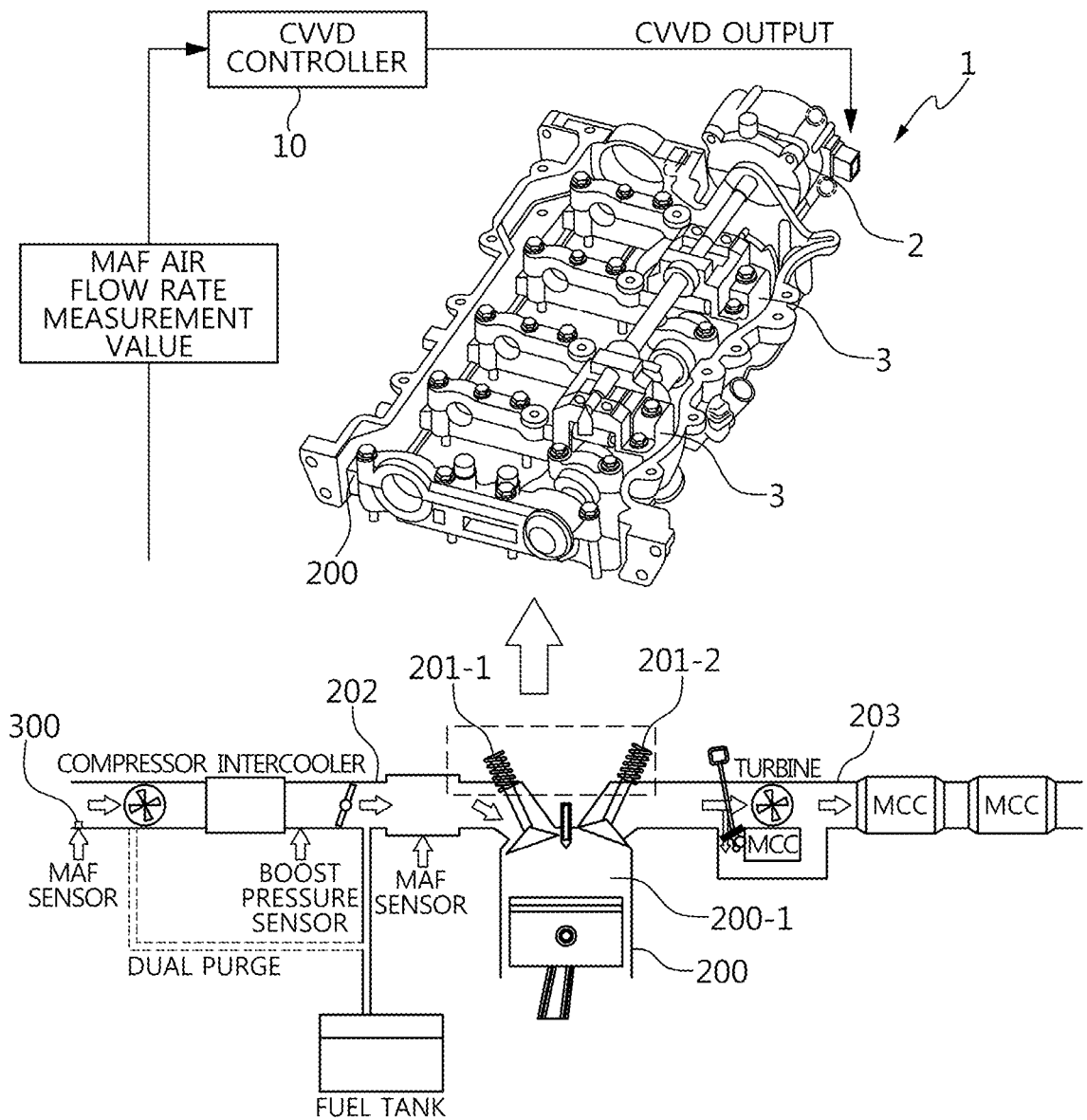
FIG. 2 is a diagram illustrating the configuration of an engine having a MAF sensor to which a CVVD system according to an exemplary embodiment of the present invention is applied.
Figure 3:
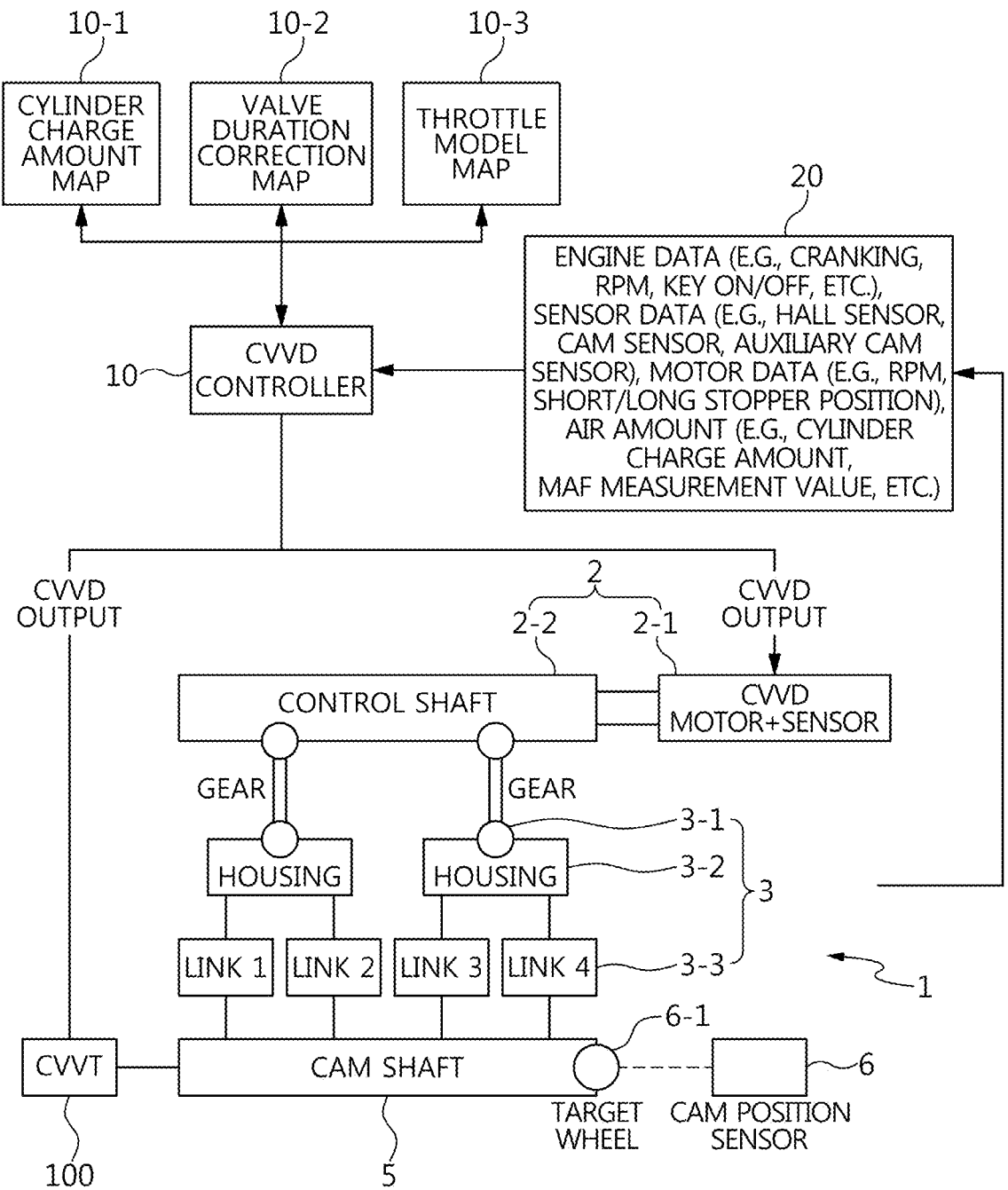
FIG. 3 is a diagram illustrating an example of a CVVD system to which a CVVD malfunction alternate control according to an exemplary embodiment of the present invention is applied.

FIG. 2 and FIG. 3 illustrate examples in which a continuously variable valve duration (CVVD) system implementing the failsafe control for air amount satisfaction is applied to an engine.

Referring to FIG. 2, a CVVD system 1 is mounted to an engine 200, and is in association with a CVVD controller 10 that receives a MAF air flow rate measurement value as input data.

As an example, the engine 200 is provided with a combustion chamber 200-1 formed in a cylinder block, and an intake valve 201-1 and an exhaust valve 201-2, for which the valve duration control is performed by the CVVD controller 10, are provided in the combustion chamber 200-1. The intake valve 201-1 forms an intake line 202 and the combustion chamber 200-1 communicate with each other to make an air flow rate of the intake line 202 flow into the combustion chamber 200-1, and the exhaust valve 201-2 forms an exhaust line 203 and the combustion chamber 200-1 communicate with each other to discharge an exhaust gas of the combustion chamber 200-1 to the exhaust line 203. Furthermore, the engine 200 is provided with a mass air flow (MAF) sensor 300 which is disposed in the intake line 202 to detect the air flow rate which is sent to the combustion chamber 200-1 as a MAF sensor flow rate measurement value.

As an example, the CVVD system 1 includes a CVVD actuator 2, a CVVD mechanism unit 3, and a cam sensor 6. The CVVD controller 10 receives an input of the MAF air flow rate measurement value as detected air amount data, and controls the CVVD actuator 2 of the CVVD controller 10.

Referring to FIG. 3, the detailed configurations of the CVVD actuator 2, the cam sensor 6, and the CVVD controller 10 are exemplified.

As an example, the CVVD actuator 2 includes a brushless direct current (BLDC) 3-phase type motor 2-1, and a control shaft 2-2 rotated by the motor 2-1 in association with a camshaft 5.

The control shaft 2-2 operates to identify an arrival at a position of a short/long duration for rotation of the motor 2-1 in physical contact with a stopper provided at a shaft end portion. The CVVD mechanism unit 3 includes a gear 3-1 associated with the control shaft 2-2, a housing 3-2 forming an external shape surrounding the gear 3-1, and links 3-3 associated with a cam of the camshaft 5 controlling opening/closing of the intake and exhaust valves 200-1 and 200-2.

As an example, the cam sensor 6 is located at an end portion of the camshaft 5, and is configured to detect a camshaft rotation angle detected by recognizing a projection of a target wheel 6-1 formed around the camshaft 5. The camshaft 5 is connected to a continuously variable valve timing (CVVT) system 100 which is controlled by a CVVT output of the CVVD controller 10. The CVVT system 100 directly controls the camshaft 5 so that valve opening/closing time points are simultaneously changed in a state where the short/long duration is fixed.

Accordingly, the CVVT system 100 performs adjustment of a cylinder charge amount and the residual gas amount by controlling the overlap timing through adjustment of a valve opening/closing time (e.g., intake valve open (IVO) and intake valve close (IVC)) and an opening/closing amount in accordance with the rotation region of the engine.

As an example, the CVVD controller 10 is associated with a cylinder charge amount map 10-1, a valve duration correction map 10-2, and a throttle model map 10-3 and generates a CVVD output for the motor 2-1 of the CVVD actuator 2. Furthermore, the CVVD controller 10 is associated with a data input device 20, and receives measurement values detected by a MAF sensor 300 and various types of sensors disposed in the engine 200 and the vehicle as input data.

Accordingly, the CVVD controller 10 may include an electronic control unit (ECU) driver associated with the cylinder charge amount map 10-1, the valve duration correction map 10-2, the throttle model map 10-3, and the data input device 20.

Specifically, if the cylinder charge amount of the combustion chamber 200-1 is a valid feedback sensor value during the failure of the CVVD system 1, the cylinder charge amount map 10-1 determines the value as the valve position, whereas if the cylinder charge amount is an unsuitable feedback sensor value, the cylinder charge amount map 10-1 matches the value with the MAF sensor flow rate measurement value of the MAF sensor 300. Accordingly, the CVVD controller 1 can be provided with the cylinder charge amount through the matching and can perform air amount alternate control (S40) in a state where a suitable air amount is secured.

If the cylinder charge amount of the combustion chamber 200-1 is a valid feedback sensor value during the failure of the CVVD system 1, the valve duration correction map 10-2 determines the value as the valve position, whereas if the cylinder charge amount is an unsuitable feedback sensor value, the valve duration correction map 10-2 corrects the valve duration by a deviation between a cylinder charge amount calculation value to which the valve position stored just before the failure occurrence is applied and a MAF sensor flow rate measurement value of the MAF sensor 300 in a steady driving region. Accordingly, the CVVD controller 1 can be provided with the cylinder charge amount through the deviation correction and can perform air amount deviation control (S50) in a state where a suitable air amount is secured.

If the cylinder charge amount of the combustion chamber 200-1 is a valid feedback sensor value during the failure of the CVVD system 1, the throttle model map 10-3 determines the value as the valve position, whereas if the cylinder charge amount is an unsuitable feedback sensor value, the throttle model map 10-3 updates an actual valve duration value based on a valve closing time predicted using the MAF sensor flow rate measurement value of the MAF sensor 300 in a steady driving region. Accordingly, the CVVD controller 1 may be provided with the cylinder charge amount through the update and can perform air amount prediction control (S60) in a state where a suitable air amount is secured.

The data input device 20 detects engine data including engine cranking (crank shaft rotation state by a start motor), engine RPM, key on/off (ignition), vehicle speed, accelerator pedal opening amount, battery voltage, and cooling water temperature/intake temperature range, detects, as CVVD data, motor RPM, control shaft rotation angle, short/long duration position, gear stuck, intake/exhaust valve lift, and cam sensor measurement values, and detects, as detected air amount data, the MAF sensor flow rate measurement value of the MAF sensor 300.

Hereinafter, the CVVD malfunction alternate control method of FIG. 1 will be described in detail with reference to FIGS. 2 to 6. In the instant case, the control subject is the CVVD controller 10, and the control targets are the CVVD system 1, the engine 200, and the engine system including the same.

Referring to FIG. 1, the CVVD controller is configured to determine the CVVD control (S20) and the CVVD failsafe control (S30) at the CVVD failure occurrence identification operation (S10).

Referring to FIG. 3, the CVVD controller 10 recognizes the operation state of the engine 200 by the engine data provided from the data input device 20, identifies the air amount supplied to the combustion chamber 200-1 by the detected air amount data, and determines whether the CVVD system 1 has failed by detecting one or more of the motor RPM, the control shaft rotation angle, the short/long duration position, the gear stuck, the intake/exhaust valve lift, and the cam sensor measurement values among the CVVD data.

As a result, if the CVVD failure occurrence (S10) determines that the CVVD system 1 is in a normal operation state, the CVVD control (S20) is maintained. In the instant case, the CVVD control (S20) is performed so that the CVVD controller 10 controls the CVVD system 1 through the air amount operation using the valve start position without an air amount calculation error, and thus the engine 200 is operated without the engine hesitation, knocking, and start-off in the operation state of the CVVD system 1. Accordingly, the CVVD control (S20) means that it is controlled by the existing CVVD control method, logic, or program.

In contrast, if the CVVD failure occurrence (S10) determines that the CVVD system 1 is in a failure state, the CVVD control is changed to the CVVD failsafe control (S30), and the CVVD failsafe control (S30) resolves the air amount error due to the failure of the CVVD system 1 with the cylinder flow amount by the alternate, deviation, or prediction through any one of air amount alternate control (S40), air amount deviation control (S50), and air amount prediction control (S60). Accordingly, even without the control of the CVVD system 1, vehicle driving (S70) can be performed until the start-off without the hesitation, knocking, and start-off of the engine 200.

Accordingly, the CVVD failsafe control (S30) can improve the engine stability as compared with a limp home to which a default value is applied.

Figure 4:
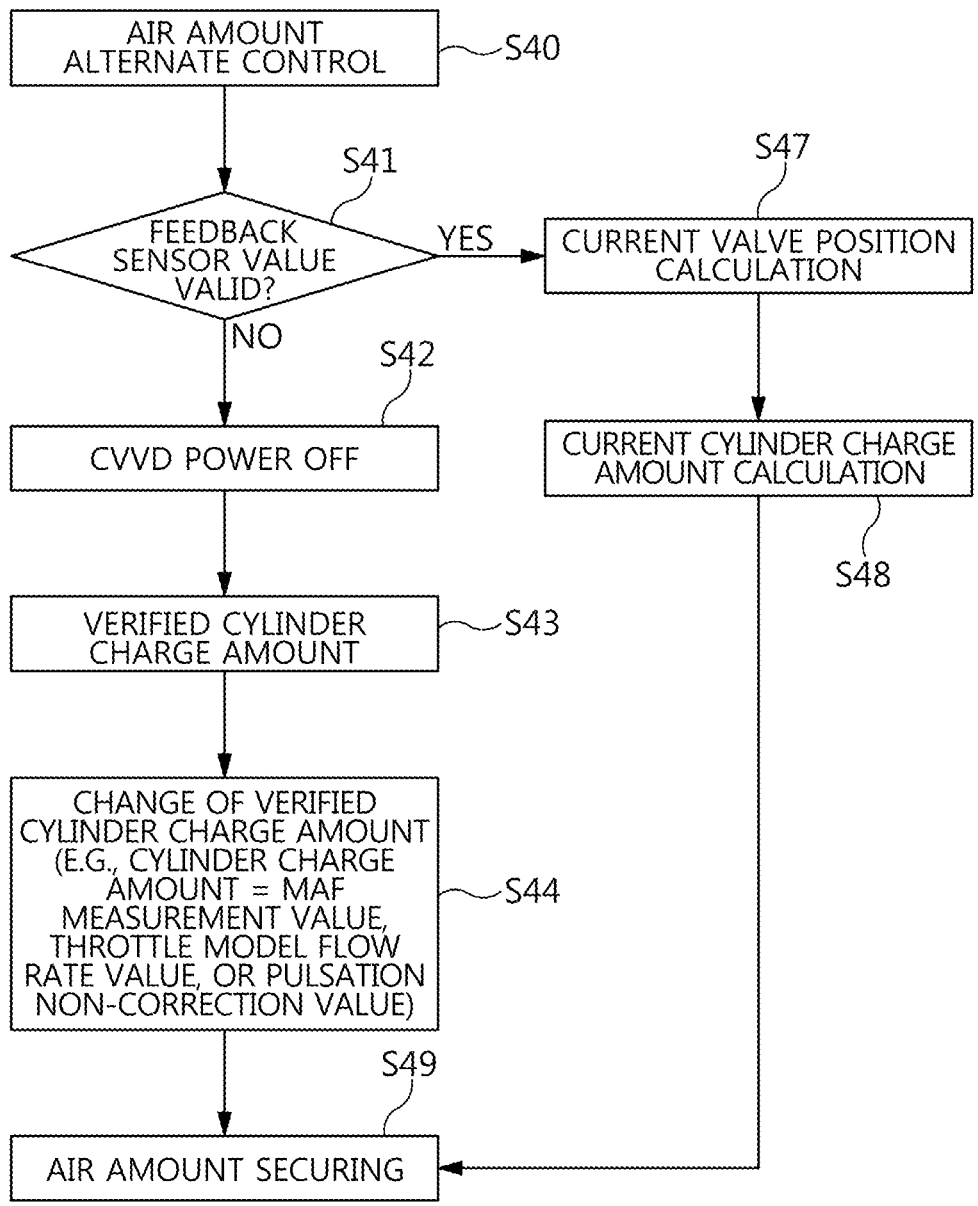
FIG. 4 is a flowchart illustrating an air amount alternate control of a failsafe control according to an exemplary embodiment of the present invention.
Figure 5:
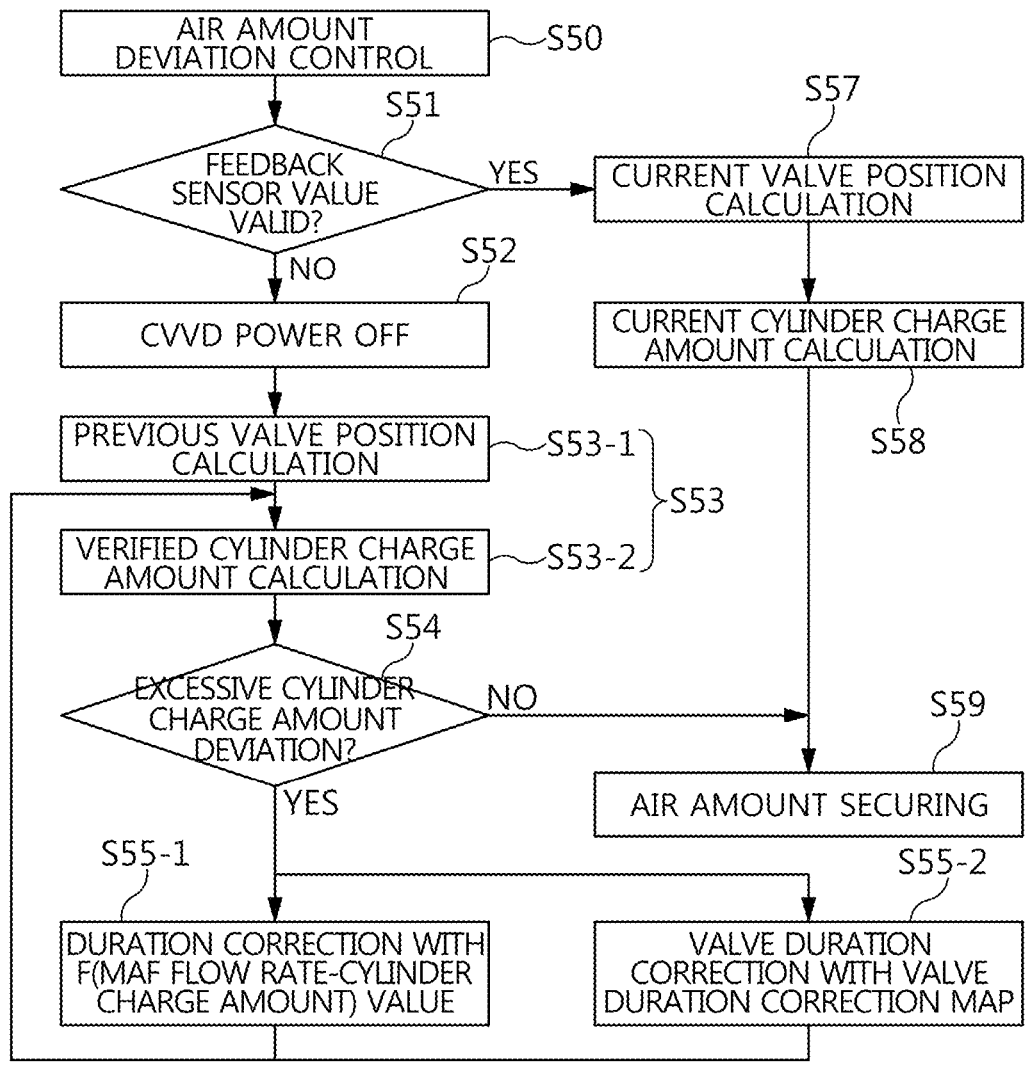
FIG. 5 is a flowchart illustrating an air amount deviation control of a failsafe control according to an exemplary embodiment of the present invention.
Figure 6:
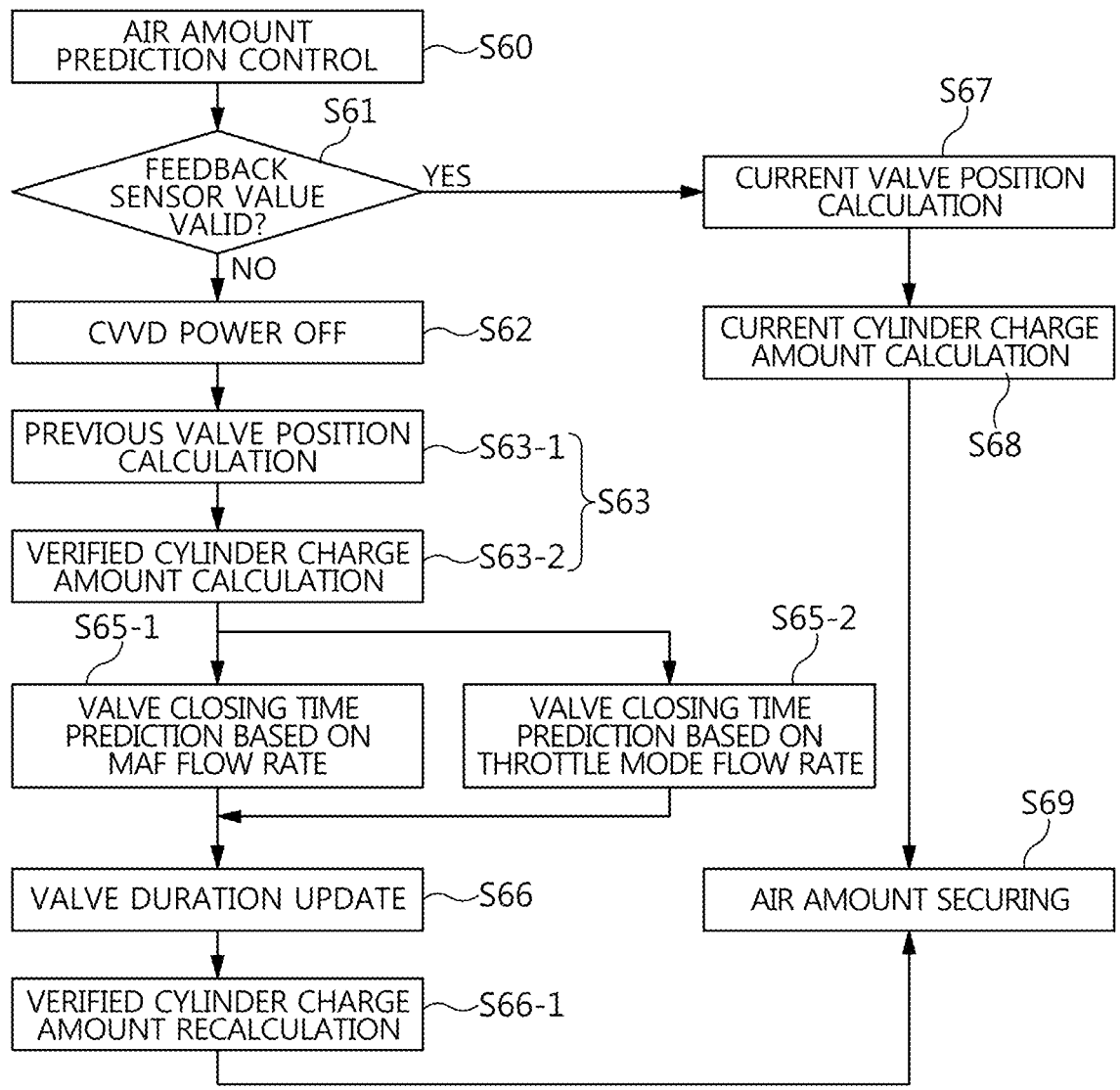
FIG. 6 is a flowchart illustrating an air amount prediction control of a failsafe control according to an exemplary embodiment of the present invention.

On the other hand, FIG. 4, FIG. 5 and FIG. 6 exemplify the air amount alternate control (S40), the air amount deviation control (S50), and the air amount prediction control (S60), respectively, and as shown in FIG. 3, the CVVD controller 10 that performs the above-described controls (S40, S50, and S60) applies one or more of the engine RPM provided from the data input device 20, key on/off (ignition), vehicle speed, and accelerator pedal opening amount in grasping the operation state of the engine 200, utilizes one or more of the motor RPM, control shaft rotation angle, short/long duration position, gear stuck, intake/exhaust valve lift, and cam sensor measurement values among the CVVD data in determining the cylinder charge amount, and utilizes the MAF sensor flow rate measurement value in correcting the cylinder charge amount error.

Hereinafter, the previous cylinder charge amount, the current cylinder charge amount, and verified cylinder charge amount mean cylinder charge amounts, but their calculation schemes may differ from each other in the failure situation of the CVVD system 1.

Referring to the air amount alternate control (S40) of FIG. 4, the air amount alternate control (S40) can secure a suitable air amount by changing the cylinder charge amount to the MAF sensor flow rate measurement value even in a CVVD power off state due to the CVVD failure.

For this, the air amount alternate control (S40) includes the steps of feedback sensor value validity determination (S41), calculation error alternate control (S42 to S44), information application control (S47 to S48), and air amount securing (S49).

As an example, the feedback sensor value validity determination (S41) determines signal detection in consideration of a control shaft rotation angle from which the short/long duration position can be known or motor RPM as a feedback sensor value. As a result, if the feedback sensor value does not have the validity, the calculation error alternate control (S42 to S44) enters, whereas if the feedback sensor value has the validity, the calculation error alternate control is changed to the information application control (S47 to S48).

As an example, the calculation error alternate control (S42 to S44) includes the steps of CVVD power-off (S42), verified cylinder charge amount identification (S43), and verified cylinder charge amount change (S44).

The CVVD power-off (S42) stops the operation of the motor 2-1 by blocking the power supply to the CVVD actuator 2. The verified cylinder charge amount identification (S43) reads the previous cylinder charge amount used just before the feedback sensor value does not have the validity.

The verified cylinder charge amount change (S44) determines a suitable cylinder charge amount without the calculation error caused by use of the previous cylinder charge amount by changing the calculation error of the read previous cylinder charge amount to an accurate alternate value.

In the instant case, the alternate value may be exemplified as the MAF sensor flow rate measurement value indicating the cylinder charge amount, the throttle model flow rate value, or the pulsation non-correction value. By directly replacing the previous cylinder charge amount by the MAF sensor flow rate measurement value, the accuracy of the value by the MAF sensor 300 of the intake line 202 is secured. As the throttle model flow rate value, the air flow rate determined from the throttle model flow rate of the flow rate model established based on the pressure ratio between the front and rear end portions of the throttle and the throttle opening amount replaces the previous cylinder charge amount. The pulsation non-correction value is a value of which the pulsation correction is not performed, and the determined air flow rate replaces the previous cylinder charge amount.

Accordingly, in the air amount securing (S49), any one cylinder charge amount of the MAF sensor flow rate measurement value, the throttle model flow rate value, and the pulsation non-correction value is secured as the air amount of the combustion chamber 200-1 even in the failure situation of the CVVD system 1.

As an example, the information application control (S47 to S48) includes the steps of current valve position calculation (S47) and current cylinder charge amount calculation (S48). The current valve position calculation (S47) determines the valve duration position by the CVVD system transmission value. The current cylinder charge amount calculation (S48) determines the cylinder charge amount in a valve duration position determined by the CVVD system transmission value.

Accordingly, in the air amount securing (S49), the cylinder charge amount accurately determined by the feedback sensor value normally detected and having the validity is secured as the air amount of the combustion chamber 200-1 even in the failure situation of the CVVD system 1.

Referring to the air amount deviation control (S50) of FIG. 5, the air amount deviation control (S50) can secure a suitable air amount by correcting the valve duration through a deviation between the cylinder charge amount calculation value to which the valve position stored just before the failure occurrence is applied and the MAF sensor flow rate measurement value of the steady driving region even in the CVVD power-off due to the CVVD failure.

For this, the air amount deviation control (S50) includes the steps of feedback sensor value validity determination (S51), calculation error deviation control (S52 to S55-2), information application control (S57 to S58), and air amount securing (S59).

As an example, the feedback sensor value validity determination (S51) determines signal detection in consideration of the control shaft rotation angle from which the short/long duration position can be known or the motor RPM as the feedback sensor value. As a result, if the feedback sensor value does not have the validity, the calculation error deviation control (S52 to S55-2) enters, whereas if the feedback sensor value has the validity, the calculation error deviation control is changed to the information application control (S57 to S58).

As an example, the calculation error deviation control (S52 to S55-2) includes the steps of CVVD power-off (S52), verified cylinder charge amount identification (S53), verified cylinder charge amount deviation determination (S54), deviation-reflected duration correction (S55-1), and map-reflected duration correction (S55-2).

The CVVD power-off (S52) stops the operation of the motor 2-1 by blocking the power supply to the CVVD actuator 2. The verified cylinder charge amount identification (S53) determines the valve position by the valve duration just before the feedback sensor value does not have the validity through calculation of the previous valve position (S53-1), and determines the verified cylinder charge amount due to the CVVD failure through calculation of the verified cylinder charge amount (S53-2).

The verified cylinder charge amount deviation determination (S54) determines the suitability through comparison of the calculation error of the verified cylinder charge amount with the MAF sensor flow rate measurement value, and for this, applies a deviation permission determination equation.

Deviation permission determination equation: A−B>C

Here, "A" denotes a MAF sensor flow rate, "B" denotes a cylinder charge amount determined as a verified cylinder charge amount, and "C" denotes a deviation threshold value. Since the deviation threshold value is differently configured to match the engine operation state at a CVVD system failure time, it is not limited to a specific numeral. Furthermore, "−" is a symbol indicating a difference between two values, and ">" is a symbol indicating the relationship in size between two values.

As a result, if a deviation value A−B obtained by subtracting the verified cylinder charge amount B from the MAF sensor flow rate A is smaller than the deviation threshold value C through "A−B>C", the verified cylinder charge amount is configured as the cylinder charge amount, whereas if the remaining measurement value A–B is larger than the deviation threshold value C, the verified cylinder charge amount is decided to be unsuitable, and thus the verified cylinder charge amount is corrected.

The deviation-reflected duration correction (S55-1) changes a calculation value of the verified cylinder charge amount in consideration of the deviation value A–B as a deviation correction factor (e.g., numeral in the range of 0 to 10). In contrast, the map-reflected duration correction (S55-2) changes the calculation value of the verified cylinder charge amount by mapping the deviation value to a map established as a table for each engine operation condition as the deviation correction factor (e.g., numeral in the range of 0 to 10).

Thereafter, a recalculated verified cylinder charge amount of the deviation-reflected duration correction (S55-1) or a recalculated verified cylinder charge amount of the map-reflected duration correction (S55-2) is calculated as the verified cylinder charge amount due to the CVVD failure through the verified cylinder charge amount calculation (S53-2), and then the suitability thereof is determined through the verified cylinder charge amount deviation determination (S54).

Accordingly, in the air amount securing (S59), the cylinder charge amount within the threshold value is secured as the air amount of the combustion chamber 200-1 even in the failure situation of the CVVD system 1.

As an example, the information application control (S57 to S58) includes the steps of current valve position calculation (S57) and current cylinder charge amount calculation (S58). In the current valve position calculation (S57), the valve duration position is determined by the CVVD system transmission value. In the current cylinder charge amount calculation (S58), the cylinder charge amount is determined in a valve duration position determined by the CVVD system transmission value.

Accordingly, in the air amount securing (S59), the cylinder charge amount accurately determined by the feedback sensor value normally detected and having the validity is secured as the air amount of the combustion chamber 200-1 even in the failure situation of the CVVD system 1.

Referring to the air amount prediction control (S60) of FIG. 6, the air amount prediction control (S60) can secure a suitable air amount by updating the actual valve duration value based on a valve closing time predicted using the MAF sensor flow rate measurement value of the steady driving region while determining the cylinder charge amount in the valve position stored just before the failure occurrence even in the CVVD power-off due to the CVVD failure.

For this, the air amount prediction control (S60) includes the steps of feedback sensor value validity determination (S61), calculation error update control (S62 to S66-1), information application control (S67 to S68), and air amount securing (S69).

As an example, the feedback sensor value validity determination (S61) determines signal detection in consideration of the control shaft rotation angle from which the short/long duration position can be known or the motor RPM as the feedback sensor value. As a result, if the feedback sensor value does not have the validity, the calculation error update control (S62 to S66) enters, whereas if the feedback sensor value has the validity, the calculation error update control is changed to the information application control (S67 to S68).

As an example, the calculation error update control (S62 to S66) includes the steps of CVVD power-off (S62), verified cylinder charge amount identification (S63), MAF flow rate based valve closing time prediction (S65-1), throttle model flow rate based valve closing time prediction (S65-2), valve duration update (S66), and verified cylinder charge amount recalculation (S66-1).

The CVVD power-off (S62) stops the operation of the motor 2-1 by blocking the power supply to the CVVD actuator 2. The verified cylinder charge amount identification (S63) determines the valve position by the valve duration just before the feedback sensor value does not have the validity through calculation of the previous valve position (S63-1), and then determines the verified cylinder charge amount due to the CVVD failure through calculation of the verified cylinder charge amount (S63-2).

In the MAF flow rate based valve closing time prediction (S65-1), the valve closing time of the valve (e.g., intake valve 201-1) configured based on the MAF flow rate of the MAF sensor flow rate measurement value is predicted. In contrast, in the throttle model flow rate based valve closing time prediction (S65-2), the valve closing time of the valve (e.g., intake valve 201-1) is predicted through mapping to the map constructed as a table for each throttle model flow rate.

In the valve duration update (S66), the valve closing time of the feedback sensor value validity loss time is updated and changed to the valve closing time using a MAF flow rate based valve closing time prediction value or a throttle model flow rate based valve closing time prediction value. In the verified cylinder charge amount recalculation (S66-1), the verified cylinder charge amount calculation value (S63-2) is changed using the updated valve closing time.

Accordingly, in the air amount securing (S69), the cylinder charge amount to which the updated valve closing time by the MAF flow rate or the throttle model flow rate is applied is secured as the air amount of the combustion chamber 200-1 even in the failure situation of the CVVD system 1.

As an example, the information application control (S67 to S68) includes the steps of current valve position calculation (S67) and current cylinder charge amount calculation (S68). In the current valve position calculation (S67), the valve duration position is determined by the CVVD system transmission value. In the current cylinder charge amount calculation (S68), the cylinder charge amount is determined in a valve duration position determined by the CVVD system transmission value.

Accordingly, in the air amount securing (S69), the cylinder charge amount accurately determined by the feedback sensor value normally detected and having the validity is secured as the air amount of the combustion chamber 200-1 even in the failure situation of the CVVD system 1.

As described above, according to the CVVD malfunction alternate control method applied to the CVVD system 1 according to the exemplary embodiment of the present invention, the CVVD controller 10 that has recognized the hardware malfunction of the continuously variable valve duration (CVVD) system resolves the calculation error of the cylinder charge amount due to the hardware failure by securing the air amount for the combustion chamber through any one of the air amount alternate control to perform the cylinder charge amount calculation by the flow rate alternate, the air amount deviation control to perform the cylinder charge amount calculation by the flow rate deviation correction, and the air amount prediction control to perform the cylinder charge amount calculation by the valve duration update. Accordingly, it is possible to protect the engine in the engine hesitation, knocking, and start-off situations due to the erroneous operation of the air amount by the accurate calculation of the amount of air with respect to the valve default position even in the CVVD hardware failure situation.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of an alternate control of a continuously variable valve duration (CVVD) malfunction, the method comprising:
a CVVD failsafe control to resolve a calculation error of a cylinder charge amount due to a hardware failure of a CVVD system with the cylinder charge amount determined by one of flow rate alternate, flow rate deviation correction, and valve duration update when the hardware failure is recognized by a CVVD controller, and to apply the cylinder charge amount to secure an air amount for a combustion chamber.

2. The method according to claim 1, wherein the CVVD failsafe control includes:
an air amount alternate control of securing the air amount through determination of the cylinder charge amount by the flow rate alternate;
an air amount deviation control of securing the air amount through determination of the cylinder charge amount by the flow rate deviation correction; and
an air amount prediction control of securing the air amount through determination of the cylinder charge amount by the valve duration update.

3. The method according to claim 2, wherein the air amount alternate control includes:
a step of determining validity of a feedback sensor value through detection of a signal for a short/long duration position in the hardware failure;
a calculation error alternate control step of determining the cylinder charge amount for resolving the calculation error of the cylinder charge amount when the feedback sensor value does not have the validity;
an information application control step of determining the cylinder charge amount alternating the calculation error of the cylinder charge amount when the feedback sensor value has the validity; and
a step of securing the air amount.

4. The method according to claim 3, wherein the calculation error alternate control includes the steps of:
turning off a CVVD power for the CVVD system;
alternating the determination of the cylinder charge amount by identifying the cylinder charge amount before determining the validity of the feedback sensor value; and
changing the cylinder charge amount to a MAF sensor flow rate measurement value after identifying the cylinder charge amount.

5. The method according to claim 4,
wherein the changing of the cylinder charge amount is performed with respect to the cylinder charge amount by a throttle model flow rate value or the cylinder charge amount by a pulsation non-correction value.

6. The method according to claim 3, wherein the information application control includes:
determining a current valve position by a valve duration position in accordance with feedback sensor value validity determination; and
determining the cylinder charge amount for securing the air amount in the valve duration position.

7. The method according to claim 2, wherein the air amount deviation control includes:
a step of determining validity of a feedback sensor value through detection of a signal for a short/long duration position in the hardware failure;
a calculation error deviation control step of determining the cylinder charge amount for resolving the calculation error of the cylinder charge amount when the feedback sensor value does not have the validity;
an information application control step of determining the cylinder charge amount alternating the calculation error of the cylinder charge amount when the feedback sensor value has the validity; and
a step of securing the air amount.

8. The method according to claim 7, wherein the calculation error deviation control includes the steps of:
turning off a CVVD power for the CVVD system;
determining the cylinder charge amount by determining a valve position using a valve duration before the feedback sensor value does not have the validity;
determining a deviation value through comparison of a MAF sensor flow rate with a cylinder charge amount calculation value, and determining a deviation of the cylinder charge amount through the deviation value; and
performing deviation correction of the cylinder charge amount calculation.

9. The method according to claim 8,
wherein deviation suitability is determined by applying a threshold value to the deviation value after determining the deviation value as a measurement value of the MAF sensor flow rate through subtraction of the cylinder charge amount calculation value therefrom.

10. The method according to claim 8,
wherein the deviation correction re-performs the cylinder charge amount calculation in consideration of the deviation value as a deviation correction factor.

11. The method according to claim 8,
wherein the deviation correction re-performs the cylinder charge amount calculation by mapping the deviation value to a map as a deviation correction factor.

12. The method according to claim 7, wherein the information application control includes:
determining a current valve position by a valve duration position in accordance with feedback sensor value validity determination; and
determining the cylinder charge amount for securing the air amount in the valve duration position.

13. The method according to claim 2, wherein the air amount prediction control includes:
- a step of determining validity of a feedback sensor value through detection of a signal for a short/long duration position in the hardware failure;
- a calculation error update control step of determining the cylinder charge amount for resolving the calculation error of the cylinder charge amount when the feedback sensor value does not have the validity;
- an information application control step of determining the cylinder charge amount alternating the calculation error of the cylinder charge amount when the feedback sensor value has the validity; and
- a step of securing the air amount.

14. The method according to claim 13, wherein the calculation error update control includes the steps of:
- turning off a CVVD power for the CVVD system;
- determining the cylinder charge amount by determining a valve position using a valve duration before the feedback sensor value does not have the validity;
- predicting a valve closing time;
- updating the valve duration by applying a valve closing time prediction to the valve duration; and
- re-performing the cylinder charge amount calculation by the valve position calculation using the valve duration update.

15. The method according to claim 14, wherein the valve closing time prediction is determined as a MAF flow rate.

16. The method according to claim 14, wherein the valve closing time prediction is determined as a throttle model flow rate.

17. The method according to claim 13, wherein the information application control includes:
- determining a current valve position by a valve duration position in accordance with feedback sensor value validity determination; and
- determining the cylinder charge amount for securing the air amount in the valve duration position.

18. A continuously variable valve duration (CVVD) system comprising:
- a CVVD controller configured to perform an air amount alternate control of securing an air amount for a combustion chamber through determination of a cylinder charge amount by a flow rate alternate to resolve a calculation error of the cylinder charge amount due to a hardware failure, an air amount deviation control of securing the air amount for the combustion chamber through determination of the cylinder charge amount by a flow rate deviation correction, and an air amount prediction control of securing the air amount for the combustion chamber through determination of the cylinder charge amount by a valve duration update.

19. The CVVD system according to claim 18, wherein the CVVD controller is configured to recognize the air amount of an intake line by a mass air flow (MAF) air flow rate measurement value detected by a MAF sensor provided in the intake line for sending an air flow rate to the combustion chamber.

20. The CVVD system according to claim 18, wherein the CVVD controller is configured to output a control command to a CVVT system connected to a cam shaft to drive the CVVT system.

* * * * *